United States Patent [19]

Kulkarni et al.

[11] Patent Number: 5,290,483
[45] Date of Patent: Mar. 1, 1994

[54] ELECTRICALLY CONDUCTIVE BLENDS OF INTRINSICALLY CONDUCTIVE POLYMERS AND THERMOPLASTIC POLYMERS AND A PROCESS FOR THEIR PREPARATION

[75] Inventors: Vaman G. Kulkarni, Charlotte, N.C.; Bernhard Wessling, Bargteheide, Fed. Rep. of Germany

[73] Assignee: Americhem, Inc., Cuyahoga Falls, Ohio

[21] Appl. No.: 81,005

[22] Filed: Jun. 22, 1993

Related U.S. Application Data

[63] Continuation of Ser. No. 773,149, Oct. 8, 1991, abandoned.

[51] Int. Cl.$^5$ .......................... H01B 1/00; H01B 1/04
[52] U.S. Cl. ................................... 252/500; 252/518; 528/422; 528/210; 525/191; 525/198
[58] Field of Search .................... 252/500, 512, 518; 528/422, 210; 525/191, 192, 198

[56] References Cited

U.S. PATENT DOCUMENTS

| | | | |
|---|---|---|---|
| 4,052,493 | 10/1977 | Etchells | 264/49 |
| 4,061,827 | 12/1977 | Gould | 428/368 |
| 4,129,677 | 12/1978 | Boe | 428/372 |
| 4,604,427 | 8/1986 | Roberts et al. | 252/500 |
| 4,617,228 | 10/1986 | Newman et al. | 428/265 |
| 4,828,756 | 5/1989 | Benton et al. | 252/518 |
| 4,855,361 | 8/1989 | Yaniger et al. | 525/436 |
| 4,929,388 | 5/1990 | Wessling | 252/500 |
| 4,935,164 | 6/1990 | Wessling et al. | 252/500 |
| 4,983,690 | 1/1991 | Cameron et al. | 525/436 |
| 5,006,278 | 4/1991 | Elsenbaumer | 252/500 |
| 5,034,463 | 7/1991 | Brokken-Zijp et al. | 525/185 |
| 5,079,096 | 1/1992 | Miyake et al. | 252/500 |

FOREIGN PATENT DOCUMENTS

| | | | |
|---|---|---|---|
| 61-127737 | 5/1987 | Japan . | |
| WO89/02155 | 3/1989 | PCT Int'l Appl. . | |
| 2214511A | 5/1989 | United Kingdom | C08K 3/00 |

OTHER PUBLICATIONS

"An Electrically Conductive Plastic Composite Derived from Polypyrrole and Poly(vinyl Chloride)" by DePaoli et al, *Journal of Polymer Science*, vol. 23 (1985).

"Conducting Polymer Fibre Prepared by Melt-Spinning Method from Fusible Polythiophene Derivative" by Yoshino et al, Polymer Communications, vol. 28, Nov. 1987.

"Electrically Conductive Fibers of Polyaniline Spun From Solutions in Concentrated Sulfuric Acid", *Synthetic Metals*, 26, (1988) pp. 383-389.

"Spectroscopic Studies of Polyaniline in Solution and in Spin-Cast Films" by Can et al, *Synthetic Metals*, 32 (1989) pp. 263-281.

United States Statutory Invention Registration No. H944 by Wade Jr., et al, Published Aug. 6, 1991.

*Primary Examiner*—Paul Lieberman
*Assistant Examiner*—M. Kopec
*Attorney, Agent, or Firm*—Renner, Kenner, Greive, Bobak, Taylor & Weber

[57] ABSTRACT

A process for preparing a conductive polymer article comprises the steps of preparing a dispersible neutral intrinsically conductive polymer; dispersing the intrinsically conductive polymer in a thermoplastic polymer to form a blend; processing the blend into the shape of the desired article; and, contacting the processed article with a dopant solution capable of both swelling the thermoplastic polymer and doping the intrinsically conductive polymer. A process for preparing neutral polyaniline comprises the steps of neutralizing doped polyaniline with a sodium carbonate solution and washing the polyaniline with a polyethyleneglycol solution. A conductive polymer article comprises a blend of an intrinsically conductive polymer and a thermoplastic polymer which is subsequently doped. A conductive polymer blend according to the invention, includes polyaniline, or insulating thermoplastic material and carbon black.

11 Claims, No Drawings

ELECTRICALLY CONDUCTIVE BLENDS OF INTRINSICALLY CONDUCTIVE POLYMERS AND THERMOPLASTIC POLYMERS AND A PROCESS FOR THEIR PREPARATION

This is a continuation of Ser. No. 07/773,149, filed Oct. 8, 1991, now abandoned.

TECHNICAL FIELD

The present invention generally relates to electrically conductive polymeric articles. More particularly the present invention relates to electrically conductive articles formed from polyaniline and thermoplastic polymer blends. Specifically the invention relates to fibers, films and tubes of such materials.

BACKGROUND ART

Intrinsically Conductive Polymers (ICP) have been studied since at the latest the 1970's. By "intrinsically conductive" it is understood to mean a material which has the inherent ability to be rendered conductive. The term "ICP" refers to organic polymers which have (poly)-conjugated $\pi$-electron systems (e.g. double bonds, aromatic or heteroaromatic rings or triple bonds). Examples of such polymers are polydiacetylene, polyacetylene (PAc), polypyrrole (PPy), polyaniline (PAni), polythiophene (PTh), polyisothionaphthene (PITN), polyheteroarylenvinylene (PArV), in which the heteroarylene group can be the thiophene, furan or pyrrole, poly-p-phenylene ($P_pP$), polyphthalocyanine (PPhc) and the like, and their derivatives (formed for example from monomers substituted with side chains or groups), their copolymers and their physical mixtures. They can exist in various states, each described by different empirical formulae, which can generally be converted essentially reversibly into one or the other by (electro-) chemical reactions such as oxidation, reduction, acid/alkali reaction or complexing. These reactions are also occasionally known as "doping" or "compensation" in the literature, or can be regarded as "charging" and "discharging" in analogy with the electrochemical processes in batteries. At least one of the possible states is a very good conductor of electricity, e.g. has a conductivity of more than 1 S/cm (in pure form), so one can speak of intrinsically conductive polymers. These forms of the ICP are generally recognized as being polyradical cationic or anionic salts.

A good overall review of the intrinsically conductive polymers synthesized to date with a chemical structure suitable for the present objective, is to be found in Synthetic Metals, Issues 17, 18, and 19 (1986), and in Synthetic Metals, Issues 27, 28 and 29 (1988), which are hereby incorporated by reference.

Despite several potentially useful properties exhibited by ICPs, their use as conductive materials has been limited because they do possess some undesirable properties such as, poor processability (no melting or glass transition temperature), poor solubility in the doped form and environmental instability. To be commercially useful, it is necessary to render these polymers processible by conventional techniques.

Several articles have appeared in the literature describing ways to overcome the processibility problem. These include attempts to synthesize soluble conductive polymers or precursors and/or polymerization of conductive polymers in situ thereby forming conductive polymer composites. Much of the known work on conductive composites using intrinsically conductive polymers such as polyaniline and polypyrrole has generally included electrochemical or chemical coating of the conductive polymer onto a polymeric substrate or electrochemical polymerization onto a swollen polymer using an appropriate solvent.

For example, U.S. Pat. No. 4,617,228 describes a process for making an electrically conductive composite by treating a porous substance such as fiberglass, with the monomer solution, and later treating with an oxidizing agent to produce a conductive composite containing an intrinsically conductive polymer. Similar techniques using a non-porous substrate and/or via solution of the monomer have been illustrated in U.S. Pat. No. 4,604,427 and Japanese Pat. No. JP 61,127,737. These composites have failed to yield highly conductive processible blends, and their preparation has proven to be cumbersome.

Blends of intrinsically conductive polymers with conventional, processible thermoplastics have been suggested to overcome processibility problems, such as shown in U.S. Pat. No. 4,935,164 (polymer blends), U.S. Pat. No. 4,929,388 (conductive pathways), International Patent Application WO 89/02155 and British Patent No. 2,214,511. These describe post polymerization processes in which the intrinsically conductive polymers are present in a dispersed phase in a thermoplastic matrix, yielding good processability and high conductivity above a certain critical volume concentration of the dispersed conductive polymer phase. These processes present a generally useful procedure to process conductive polymers into various forms.

As used in the art and as employed herein, the term "polymer blend" is generally understood to mean macroscopically homogeneous mixtures of partly compatible or incompatible organic polymers. They always consist of two or more phases.

Nevertheless there is still a disadvantage resulting from the chemical nature of most of the conductive polymers which include protonic acids as "dopants". They react directly or indirectly with various functional groups present in the polymer matrices which are susceptible to reactions with acids or bases. More specifically, for instance, the basic nature of various homopolymers and copolymers of polyamides (nylons) provides a basic environment which leads to partial dedoping (compensation) of the conductive polymer and/or degradation of the polymer matrix. The same result appears to occur with several aromatic or aliphatic esters present in the various polyester homopolymers or copolymers (regardless of whether they are aromatic or aliphatic) which are used according to the above-mentioned procedures.

For several applications, such as engineering or fiber forming resins, the reactivity of ICP's with the resins during processing encountered additional problems. It was found that the processing temperature was higher than the thermal stability of the ICP used, so that the resulting products still showed some disadvantages preventing their practical use. It was therefore, proposed in European Patent No. 0168620 to use the neutral (compensated) form of the respective ICP, to disperse these in the matrix polymer and dope the resulting blend after formation of the finished or semi-finished article.

However, when practicing this procedure with several matrix polymers such as nylons, polyesters and other fiber forming resins, some specific problems occurred. It was found that these problems cannot be solved by merely following the teaching of the above referenced patents. Further problems were also encountered such as lack of specific procedures for providing dispersible neutral ICPs, because ICPs were found to be not dispersible, and lack of specific doping technique for the finished articles.

DISCLOSURE OF THE INVENTION

It is therefore, an object of the present invention to provide ICP and thermoplastic polymer articles, such as nylon-ICP and polyester-ICP blends, and more specifically fibers, films and tubes.

It is a further object of the present invention to provide a conductive polymeric article as above which also possesses desired engineering properties.

It is another object of the present invention to provide a process for producing a thermoplastic ICP polymer blend, specifically polyaniline/thermoplastic polymer blends wherein the thermoplastic polymer has a melt processibility temperature of 220° C. or higher.

It is still another object of the present invention to produce a dispersible neutral-ICP, specifically neutral polyaniline.

It is yet another object of the invention to develop specific doping procedures to make conductive antistatic fibers, films and tubes.

In general, a process for preparing a conductive polymer article comprises the steps of preparing a dispersible neutral intrinsically conductive polymer, dispersing the neutral intrinsically conductive polymer in a thermoplastic polymer to form a blend, processing the blend into the shape of the desired article and, contacting the processed blend with a dopant solution.

A process for preparing neutral polyaniline comprises the steps of neutralizing doped polyaniline with a base solution, and, washing the polyaniline with a dispersing aid solution.

A conductive polymer article according to the invention comprises a blend comprising an intrinsically conductive polymer and a thermoplastic polymer. The blend is contacted with a dopant solution after the intrinsically conductive polymer and the thermoplastic polymer are blended.

A conductive polymer blend comprises from about 1 to about 30 parts by weight of polyaniline; from about 99 to about 60 parts by weight of an insulating thermoplastic material comprising a thermoplastic polymer; and, from 0 to about 10 parts by weight of carbon black. The blend has a conductivity of greater than about $10^{-9}$ S/cm.

At least one or more of the foregoing objects, together with the advantages over known compositions and processes shall become apparent from the specification which follows, and are accomplished by the invention as herein described and claimed.

PREFERRED EMBODIMENT FOR CARRYING OUT THE INVENTION

According to the present invention, a novel blend of intrinsically conductive polymers and thermoplastic materials wherein the thermoplastic polymer has a melt processing temperature in excess of 220° C., is achieved despite the fact that the intrinsically conductive polymer in either neutral or conductive form is not melt processible nor soluble in useful, conventional organic solvents. The invention provides for fabricated articles of such blends, and a process for their preparation. While the invention may successfully make use of any of the ICP's discussed hereinabove, it is preferably a blend of polyaniline and a suitable thermoplastic material.

For example, the present invention has particular application to mat and carpet materials. A fiber produced according to the present invention may be woven into a mat or carpet, which mat or carpet would act so as to carry away any electrical potential which might be generated by friction or the like.

Neutral polyaniline is prepared by reacting doped polyaniline with a solution of sodium carbonate and water, and washing thoroughly with water until free of alkali or until the wash water is neutral. It is also possible to use bases such as $NH_3$ or others. If one would conventionally dry the raw, neutral polyaniline, a further dispersion is almost not possible. Therefore, the filter cake thus produced must be treated with a dispersing aid, viz, with a solution of polyethylene glycol. It is preferred that the doped polyaniline be reacted with a 10 percent solution of sodium carbonate and water, and the solution to treat the filter cake is preferably a 5 percent solution of polyethylene glycol. Other dispersion aids may also be employed, but polyethylene glycol and similar compounds are preferred.

The neutral polyaniline, prepared as discussed hereinabove, preferably in powdered form, is dispersed in the desired thermoplastic polymer. The neutral polyaniline may also be dispersed with a semi-compatible polymer or polymers in concentrate form, and then mixed with the host thermoplastic polymer as described for example, in U.S. Pat. No. 4,929,388. Useful thermoplastic polymers would include any of those known in the art. For example nylons such as nylons 6, 6/6,11,12 as well as copolymers and terpolymers thereof are useful. The invention can also include the following thermoplastic polymers, with the choice of a proper solvent or solvents for swelling the thermoplastic matrix: polyethylene terephthalate, polycarbonate, polyurethane, polyesters, polyacetate, polyacrylate, and copolymers and mixtures thereof. Possible predispersions include polycaprolactone and nylon copolymers. These thermoplastic polymers possess various properties not possessed by the ICP, such as melt processibility and mechanical strength.

Dispersion may be carried out using single or twin screw extruders, Banburies, continuous kneaders, and the like.

It is preferred that from about 1 to about 30 percent by weight of neutral polyaniline be compounded into the thermoplastic polymer. Typical compositions contain from about 10 to about 20 percent by weight of neutral polyaniline.

After the neutral polyaniline and thermoplastic blend has been formed, the blend may be fabricated into a desired article. For example a 10 percent by weight polyaniline and 90 percent by weight nylon 6 blend may be melt processed into a thin film. Even though the melt process is carried out at temperatures in excess of 235° C., the neutral polyaniline remains stable.

Processing may be employed to fabricate any desired article wherein conductivity is desired, and no single such article is considered to be an absolute limitation of the present invention. For instance, in addition to thin films and fibers, tubings and other such articles may also be produced. Conductive fibers formed from a polyaniline and nylon blend would have application in antistatic fabrics, carpets and the like.

After processing the desired article, the ICP which is preferably polyaniline, must be doped in order to render it conductive. Many agents are known in the art for doping polyaniline. For purposes of the present invention it is necessary that the doping agent be capable of swelling the blended thermoplastic so that the agent may contact and dope the neutral ICP. The solvent-doping agent system employed softens the thermoplastic polymer, allowing doping of the neutral ICP rendering the processed article conductive. Thus, the doping agent itself may be capable of swelling the thermoplastic polymer, or a solvent system including a mixture of an organic solvent and a doping agent, may be employed.

Any system such as a solvent-acid solution, which will soften the thermoplastic and dope the ICP is within the scope of the present invention. It is necessary that the agent be not highly corrosive to the thermoplastic, i.e. it must be able to be controlled by time of exposure and/or solubility factors to swell the thermoplastic just enough to allow it to contact the ICP without completely dissolving the thermoplastic.

Preferred doping agents include dilute formic acid having a concentration of from about 10 to about 99 percent by weight of formic acid, preferably having a concentration of from about 50 percent to about 70 percent by weight, dilute formic acid/organic sulfonic acids, dilute formic acid/phosphoric acid and phosphoric acid derivatives such as an ethylene oxide condensate type, dilute formic acid/organic phosphate esters or other Brönsted acids for the nylon system; orthochlorobenzene/organic sulfonic acids or other Brönsted acids for the polyester system; methylene chloride or other halogenated solvents/para-toluene sulfonic acid or other Brönsted acids for copolyesters. Another preferred doping agent is 0.5M para-toluene sulfonic acid prepared in an aqueous formic acid solution containing 50 percent formic acid by weight.

As will be appreciated by those skilled in the art, the present invention also has application to conductive polymer blends. Applicant's co-pending patent application U.S. Ser. No. 07/648,734 discloses conductive polymer blends, and is hereby incorporated by reference to show exemplary conductive blends. The blends according to the present invention may include polyaniline, a thermoplastic material such as disclosed hereinabove and chlorinated polyethylene, polyvinyl chloride and copolymers and mixtures thereof, and optionally, an additive such as carbon black. The carbon black may be any known carbon black, such as the channel or furnace blacks, or the like. One preferred blend would include from about 1 to about 30 parts by weight of polyaniline, from about 99 to about 60 parts by weight of the thermoplastic material, and from about 0 to about 10 parts by weight of carbon black.

Experimental

In order to demonstrate the effectiveness of the present invention in achieving the objects hereof, a number of articles were produced according to the present disclosure. The experiments and conductive efficiencies achieved are discussed as follows. By "dispersion" discussed herein, it is understood that techniques are contemplated are known and conventional in the art for compounding materials, such as those employing single or twin screw extruders. No single compounding technique or piece of equipment is considered to be an absolute limitation of the present invention, and any such techniques which will achieve the compounding parameters discussed herein are considered to be within the scope of the invention.

Experiment 1

Polyaniline was synthesized according to the procedure described in WO 89/02155 discussed hereinabove. The raw filter cake was suspended in cold water and filtered again. The wet filter cake (approximately 1100 grams) was suspended in a 10 percent sodium carbonate solution in water and intensively stirred and then filtered. This procedure was repeated three times. The wet, neutralized (compensated) polyaniline filter cake was again washed once with hot water for 10 minutes under very intensive stirring and then filtered. The resulting filter cake was washed with hot water containing 5 percent by weight of polyethylene glycol (PEG 20000, available from Hoechst Fibers Industries of Spartansburg, S.C.) and filtered. The filter cake was then dried under air at 80° C.

Experiment 2

Ten grams of neutral polyaniline, 6.6 grams of polycaprolactone and 60 grams of a nylon 6 copolymer were mixed in a twin screw extruder yielding a 10 percent neutral polyaniline compound in nylon 6.

Experiment 3

Ten grams of neutral polyaniline, 14 grams of nylon copolymer (Rilsan H-30, available from Atochem North America), 1 part of lubricant of montan ester type and 75 parts of nylon 6 were mixed in a twin screw extruder, yielding a 10 percent neutral polyaniline compound.

Experiment 4

The 10 percent neutral polyaniline in nylon 6 blends prepared in Experiments 2 and 3 were then melt processed as 235° C. into thin films using a platten press. These films were then cut into squares of approximately 5 centimeters by 5 centimeters, and had a thickness of approximately 0.2 mm (for films processed via nylon predispersion and polycaprolactone predispersion) and 0.1 mm (polycaprolactone predispersion), and were found to have bulk resistance of from $7.0 \times 10^{11}$ to about $8.0 \times 10^{11}$ Ohms.

Experiment 5

The neutral polyaniline/nylon 6 blends as prepared in Experiment 2 were processed into fibers using a Hills spinning line and a manual take up spool.

Experiment 6

The thin films as prepared in Experiment 4 were brought into contact with aqueous formic acid solutions ranging in acid concentrations of about 50 percent by weight to about 90 percent by weight for various intervals of time. The bulk resistance of each of these squares was then ascertained. The results are tabulated in TABLES I, II and III.

TABLE I

Bulk Resistance (Ohms) of Thick (0.2 mm) Films Processed From Polyaniline/Nylon 6 Blends Made According to Experiment 3

| Acid Concentration %, Volume | Instant[a] | 10 seconds | 30 seconds | 1 minute |
|---|---|---|---|---|
| 50 | $7.3 \times 10^5$ | $2.8 \times 10^6$ | $5.5 \times 10^6$ | $1 \times 10^6$ |
| 60 | $7.4 \times 10^5$ | $1.1 \times 10^6$ | $3.8 \times 10^6$ | b |
| 70 | $2.3 \times 10^5$ | $1.8 \times 10^6$ | b | b |
| 80 | Dissolved | Dissolved | Dissolved | Dissolved |

[a]Article contacted by solution for less than about one second.
[b]Not measured

TABLE II

Bulk Resistance (Ohms) of Thick (0.2 mm) Films Processed From Polyaniline/Nylon 6 Blend Made According to Experiement 2

| Acid Concentration %, Volume | Instant[d] | 10 seconds | 30 seconds | 1 minute |
|---|---|---|---|---|
| 50 Formic Acid | $7.2 \times 10^8$ | $2.3 \times 10^8$ | $8.2 \times 10^8$ | $4.0 \times 10^7$ |
| 60 Formic Acid | $8.3 \times 10^8$ | $4.8 \times 10^6$ | $1.6 \times 10^7$ | $1.0 \times 10^7$ |
| 70 Formic Acid | $3.3 \times 10^6$ | $5.0 \times 10^5$ | $7.4 \times 10^4$ | $3.4 \times 10^4$ |
| 0.25M TSA[e] in 50% Formic Acid | $1.0 \times 10^6$ | $8.4 \times 10^5$ | $5.4 \times 10^4$ | $3.4 \times 10^4$ |
| 0.25M MSA[f] in 50% Formic Acid | $4.3 \times 10^7$ | $5.4 \times 10^7$ | $2.8 \times 10^6$ | $6.5 \times 10^7$ |

TABLE III

Bulk Resistance (Ohms) of Thin (0.1 mm) Films Processed From Polyaniline/Nylon 6 Blends Made According to Experiment 2

| Acid Concentration %, Volume | Instant[d] | 10 seconds | 30 seconds | 1 minute |
|---|---|---|---|---|
| 50 Formic Acid | $1.8 \times 10^8$ | $1.3 \times 10^8$ | $5.3 \times 10^7$ | $6.1 \times 10^6$ |
| 60 Formic Acid | Dissolved | Dissolved | Dissolved | Dissolved |
| 70 Formic Acid | Dissolved | Dissolved | Dissolved | Dissolved |
| 0.25M TSA[e] in 50% Formic Acid | $1.4 \times 10^7$ | $1.2 \times 10^6$ | $6.0 \times 10^7$ (PD) | $9.2 \times 10^4$ |
| 0.25M MSA[f] in 50% Formic Acid | $7.5 \times 10^7$ | $4.3 \times 10^6$ | $1.3 \times 10^6$ | $4.0 \times 10^5$ |

[c]Article contacted by solution for less than about one second.
[d]Article contacted by solution for less than about one second.
[e]Toluene sulfonic acid.
[f]Methane sulfonic acid.
PD = partly dissolved

Experiment 7

The fibers as prepared in Experiment 5 were brought into contact with aqueous formic acid and an aqueous formic acid solution containing organic sulfonic acids. The resistance of a bundle of three fibers at one inch apart was measured. The results are shown in TABLE IV hereinbelow. The resistance of undoped fibers was also tested, and was found to be greater than $1 \times 10^{12}$ Ohms. The fibers were 0.02 mm thick.

TABLE IV

Bulk Resistance (Ohms) of Fibers Processed From Polyaniline/Nylon 6 Blends Made According to Experiment 2

| Acid Concentration %, Volume | Instant[g] | 10 seconds | 30 seconds | 1 minute |
|---|---|---|---|---|
| 50 | $7.2 \times 10^8$ | $1.5 \times 10^8$ | $8.0 \times 10^7$ | Dissolved |
| 60 | Dissolved | Dissolved | Dissolved | Dissolved |
| 70 | Dissolved | Dissolved | Dissolved | Dissolved |
| 0.25M TSA[h] in 50% Formic Acid | $5 \times 10^8$ | $7.2 \times 10^7$ | $3 \times 10^7$ (PD) | Dissolved |
| 0.25M MSI[i] in 50% Formic Acid | $6.8 \times 10^9$ | $2 \times 10^8$ | (PD) | Dissolved |

[g]Article contacted by solution for less than about one second.
[h]Toluene sulfonic acid.
[i]Methane sulfonic acid.
PD = partly dissolved

Experiment 8

A 10 percent neutral polyaniline compound was prepared by mixing 10 grams of neutral polyaniline and 90 grams of plasticized nylon 12 in an internal mixer. Film formation and doping was carried out as in Experiments 4 and 6 hereinabove. The bulk resistance of the films are tabulated in TABLE V hereinbelow.

TABLE V

Bulk Resistance (Ohms) of Thick (0.2 mm) Films Processed From Polyaniline/Nylon 12 Blend

| Acid Concentration %, Volume | Instant[j] | 10 seconds | 30 seconds | 1 minute |
|---|---|---|---|---|
| 50 | $2.0 \times 10^8$ | $9.0 \times 10^7$ | k | k |
| 60 | $2.6 \times 10^8$ | $1.0 \times 10^8$ | k | k |
| 70 | $1.5 \times 10^8$ | $1.2 \times 10^7$ | $3.5 \times 10^7$ | $7.4 \times 10^6$ |

[j]Article contacted by solution for less than about one second.
[k]Not measured

Experiment 9

A conductive polymer blend was prepared by forming a composition containing 20 parts by weight of polyaniline, 10 parts by weight of carbon black, 48 parts by weight of chlorinated polyethylene, 15 parts by weight of sulfonamide plasticizer, 5 parts by weight of organic phosphate surfactant and 2 parts by weight of stabilizer. The composition showed a conductivity of 10.1 S/cm.

It is known in the art, that to improve the conductance of an article its resistance must be lowered. The data tabulated herein shows that bulk resistance improvements have been achieved by articles according to the present invention. More specifically resistances as low as $3.4 \times 10^4$ Ohms have been achieved.

In order to provide a degree of relevance to the data provided herein, it is noted that it is generally accepted in the art that a material employed to make an anti-static article should have a resistance of less than about $1 \times 10^{10}$ Ohms, and that those materials having a resistance of less than $10^8$ Ohms are considered superior. Thus the present invention, in achieving a consistent bulk resistance of from about $8.3 \times 10^8$ Ohms, to as low as $3.4 \times 10^4$ Ohms represents a useful improvement in the art. Furthermore, the blend so employed contains a nylon or other thermoplastic which is useful for the formation of articles such as those use to fabricate an anti-static mat.

Formic acid concentrations above about 80 percent by weight have been found to dissolve a nylon matrix, especially when the articles are thin. By varying these conditions according to the disclosure made herein, one skilled in the art will obtain useful articles within the scope of the invention.

Based upon the foregoing exemplification, it can be seen that the present invention provides intrinsically conductive polymer/thermoplastic blend articles as well as a process for their preparation. It is to be understood that the examples reported herein have been provided to present results obtainable by practice of the disclosed invention. Inasmuch as a wide variety of thermoplastics and doping agents have been disclosed as used in conjunction with polyaniline to form articles according to the invention, this invention is not limited to the specific examples provided herein. Furthermore, the process for preparing these conductive articles is believed to be operable with ICP's, thermoplastics, doping agents, concentrations, temperatures and process conditions other than those which have been exemplified herein. Thus it should be evident that the determination of particular ICP's, thermoplastics, doping agents, process conditions and the like, as well as the amounts thereof, can be made without departure from the spirit of the invention herein disclosed and described, and the scope of the invention shall include all modifications and variations that fall within the scope of the attached claims.

What is claimed is:

1. A process for preparing a conductive polymer article comprising the steps of:
   preparing a dispersible neutral intrinsically conductive polymer by neutralizing a doped intrinsically conductive polymer with a base solution to form a wet filter cake; and washing said wet filter cake of said neutralized intrinsically conductive polymer with a dispersing aid;
   said dispersing aid being a solution of polyethylene glycol in water;
   dispersing said neutral, intrinsically conductive polymer in a thermoplastic polymer to form a blend;
   processing said blend into the shape of the desired article; and,
   contacting said processed blend with a dopant solution, whereby said dopant solution swells said thermoplastic polymer, and dopes said neutralized intrinsically conductive polymer.

2. A process as set forth in claim 1, wherein said intrinsically conductive polymer is polyaniline.

3. A process as set forth in claim 1, wherein said thermoplastic polymer is selected from the group consisting of nylon 6, 6/6, 12 and 11, as well as copolymers and terpolymers thereof; polyethylene terephthalate; polycarbonate; and, polyurethane.

4. A process as set forth in claim 1, wherein said blend is thermo-processed into a film.

5. A process as set forth in claim 1, wherein said blend is thermo-processed into fibers.

6. A process as set forth in claim 1, wherein said dopant solution is selected from the group consisting of dilute formic acid solutions having a concentration of from about 10 to about 99 percent by weight of formic acid; mixtures of formic acid and and organic sulfonic acids; and, mixtures of formic acid and phosphoric acid and phosphoric acid derivatives.

7. A process as set forth in claim 1, wherein said dopant solution is selected from the group consisting of dilute formic acid solutions having a concentration of from about 10 to about 99 percent by weight of formic acid; mixtures of formic acid and organic sulfonic acids; and, mixtures of formic acid and phosphoric acid and phosphoric acid derivatives.

8. A process as set forth in claim 1, wherein said blend comprises from about 1 to about 30 percent by weight of said intrinsically conductive polymer and from about 99 to about 70 percent by weight of said thermoplastic polymer.

9. A process as set forth in claim 1, further comprising the initial step of forming a predispersion of said intrinsically conductive polymer with a polymer material which is at least partially compatible with said thermoplastic polymer.

10. A process as set forth in claim 9, wherein said polymer material of said predispersion is selected from the group consisting of polycaprolactone and nylon copolymers and terpolymers.

11. A process as set forth in claim 1, wherein said intrinsically conductive polymer is blended in powder form.

* * * * *

UNITED STATES PATENT AND TRADEMARK OFFICE
CERTIFICATE OF CORRECTION

PATENT NO. : 5,290,483
DATED : March 1, 1994
INVENTOR(S) : Vaman G. Kulkarni and Bernhard Wessling It is certified that error appears in the above-indentified patent and that said Letters Patent is hereby corrected as shown below:

Column 10, lines 14-20 (claim 6) should be cancelled.

Column 10, after line 44, insert claim 12 as follows:

12. A process as set forth in claim 7, wherein said phosphoric acid derivative is an ethylene oxide condensate type organic phosphoric acid.

Signed and Sealed this

Eighteenth Day of November 1997

*Attest:*

BRUCE LEHMAN

*Attesting Officer*   Commissioner of Patents and Trademarks